Patented June 12, 1945

2,378,199

UNITED STATES PATENT OFFICE 2,378,199

SYNTHETIC RESINOUS COMPOSITIONS COMPRISING INTERCONDENSATION PRODUCTS OF VINYL ESTERS, GUANAZOLES, ALDEHYDES, AND/OR KETONES

Gaetano F. D'Alelio, Pittsfield, Mass., assignor to General Electric Company, a corporation of New York No Drawing. Application October 14, 1942, Serial No. 461,997

20 Claims. (Cl. 260—42)

This invention relates to the production of new materials having valuable and characteristic properties that make them especially suitable for use in industry, for example, in molding, laminating, coating and adhesive applications, and for other purposes. The invention is concerned more particularly with the production of polyvinyl acetal, ketal, or acetal and ketal compositions prepared in the presence of, and intercondensed with the aldehyde, ketone, or aldehyde and ketone reaction product of a 1-substituted guanazole represented by the formula

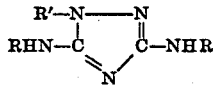

where R' is a monovalent hydrocarbon radical, e. g., methyl, ethyl, butyl, isobutyl, neopentyl, allyl, butenyl, phenyl, naphthyl, benzyl, phenethyl, tolyl, xylyl, allyl phenyl, ethyl phenyl, cyclopentyl, cyclopentenyl, cyclohexyl, cyclohexenyl, methyl naphthyl, etc. R may be the same as R' and, in addition, hydrogen. Mainly because of commercial availability of the materials for preparation of the guanazoles and because of the ease of preparation, I prefer that the 1-substituted guanazoles used in practicing my invention be those represented by the above general formula where R is hydrogen and R' is an aryl radical, more particularly, a phenyl, tolyl, or naphthyl radical.

Specific examples of 1-substituted guanazoles that may be used are:

1-methyl guanazole
1-ethyl guanazole
1-propyl guanazole
1-butyl guanazole
1-phenyl guanazole
1-chlorophenyl guanazole
1-tolyl guanazole
1-xylyl guanazole
1-ethylphenyl guanazole
1-hydroxyphenyl guanazole
1-(alpha-naphthyl) guanazole
1-(beta-naphthyl) guanazole
1-chloronaphthyl guanazole
1-phenyl-$N^3,N^5$-dimethyl guanazole
1-ethyl-$N^3$-phenyl guanazole
1-tolyl-$N^5$-ethyl guanazole
1-tolyl-$N^3,N^5$-diphenyl guanazole
1-naphthyl-$N^3,N^5$-ditolyl guanazole
1-cyclohexyl guanazole
1-cyclopentyl guanazole These guanazoles are easily prepared by the reaction of the appropriate hydrazine with the appropriate biguanide according to the following general equation:

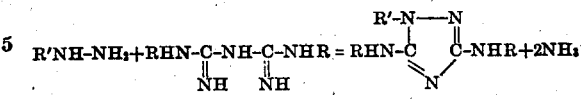

In the above equation R and R' have the meanings previously given. Preferably the reaction is carried out in an inert solvent, e. g., water, alcohol, or mixtures of water and alcohol, at the boiling temperature of the mass under reflux, and in the presence of 1 mol of a mineral acid for each mol of ammonia that is liberated. The free acid may be added or it may be added as the salt of either or both the biguanide and hydrazine. Where at least one of the amino (—NHR) groups is to be unsubstituted (i. e., —NH₂) then the appropriate cyanoguanidine may be substituted for the biguanide.

In carrying my invention into effect I hydrolyze a thermoplastic polymer of a vinyl ester or I start with a previously hydrolyzed thermoplastic polymer of a vinyl ester. I then cause the hydrolyzed polymer to react with a

-containing organic compound selected from the class consisting of aldehydes, ketones and mixtures of aldehydes and ketones until at least some of the hydroxyl groups of the hydrolyzed polymer have been replaced by acetal, ketal, or acetal and ketal groups. For example, I may hydrolyze the polymer to at least 10 per cent, more particularly from 25 to 100 per cent, of that theoretically possible and acetalize, ketalize, or acetalize and ketalize the hydrolyzed polymer until at least 10 per cent of the hydroxyl groups of the hydrolyzed polymer have been replaced by acetal, ketal, or acetal and ketal groups. In some cases, for instance, where the resistance of the product to water is of secondary consideration, the hydrolyzed polymer may have only a minor proportion (that is, less than 50 per cent) of its hydroxyl groups replaced by acetal, ketal, or acetal and ketal groups. Particularly valuable products are obtained when the polymer is hydrolyzed to from 50 to 100 per cent of that theoretically possible and the hydrolyzed polymer is acetalized, ketalized, or acetalized and ketalized until from 75 to 100 per cent of the hydroxyl groups of the hydrolyzed polymer have been replaced by acetal, ketal, or acetal and ketal groups.

When starting with a vinyl ester polymer, I prefer to cause the hydrolysis and acetalization, ketalization or acetalization and ketalization reaction simultaneously with the intercondensation of the guanazole-aldehyde, guanazole-ketone, or guanazole-aldehyde-ketone resin. When starting with polymerized vinyl alcohol (polyvinyl alcohol) or a partially hydrolyzed polymerized vinyl ester, I prefer to cause further hydrolysis simultaneously with the acetalization, ketalization, or acetalization and ketalization and intercondensation with the guanazole resin.

Without departing from the scope of my invention, I may use a copolymer, instead of a polymer of a vinyl ester, wherein the major component of the copolymer is a vinyl ester. However, since the use of such copolymers does not add any desirable properties to the final product I prefer to use only polymerized vinyl esters or their hydrolysis products as the starting ingredient.

When the lightest colored product possible is desired, especially when using aldehydes other than formaldehyde as the acetalizing agent or ketones as the ketalizing agent, I prefer to start with polyvinyl alcohol and to carry out the simultaneous acetalization, ketalization, or acetalization and ketalization and intercondensation with the guanazole resin at room temperature.

In order that those skilled in the art better may understand how to practice this invention, the following more detailed description is given:

*Preparation of polymer*

The vinyl ester polymer may be made by any of the methods well known to those skilled in the art. For example, the vinyl ester may be polymerized in the presence or absence of a solvent or dispersion medium for the vinyl ester, in the presence or absence of a polymerization catalyst by the use of heat, light, or heat and light at atmospheric, subatmospheric or superatmospheric pressure.

Suitable catalysts are the peroxides, e. g., benzoyl peroxide, sodium peroxide, hydrogen peroxide, acetyl benzoyl peroxide, etc.; the per-compounds, e. g., ammonium persulfate, sodium persulfate, sodium perchlorate, sodium perborate, potassium persulfate, etc.; ozone; ozonides; etc. Additional examples of polymerization catalysts that may be used are found in my U. S. Patent 2,260,005, issued October 21, 1941 and assigned to the same assignee as the present invention.

The rate of polymerization and the properties of the polymer vary with the time, temperature, concentration and, if a catalyst is used, also with the catalyst concentration, as well as upon the particular monomer or partial polymer employed in preparing the polymer. Polymerization may be effected at from room temperature (20° to 30° C.) to temperatures above 100° C., for example, about 130° C., but ordinarily I use temperatures within the range of 60° to 120° C. in causing polymerization.

In certain cases, instead of polymerizing a single vinyl ester, I may copolymerize a plurality of such esters.

Illustrative examples of vinyl esters which may be polymerized to produce the thermoplastic polymer of a monocarboxylic acid are the vinyl esters of saturated aliphatic and aromatic monocarboxylic acids, more specifically the vinyl esters of the following acids: acetic, formic, chloroacetic, propionic, bromobutyric, butyric, iso-butyric, valeric, caproic, heptylic, caprylic, nonylic, capric, palmitic, benzoic, toluic, phenyl acetic, chlorobenzoic, cyclohexanoic, cyclopentanoic, etc. I may also use mono-vinyl esters of partially esterified poly-carboxylic acids, for example, the mono-vinyl esters of mono-ethyl phthalate, mono-methyl succinate, di-ethyl citrate, etc.

*Treatment of copolymer*

The polymer may be partially or completely hydrolyzed and thereafter acetalized, ketalized, or acetalized and ketalized, or the partial or complete acetalization, ketalization, or acetalization and ketalization of the polymer may be caused to take place simultaneously with the partial or complete hydrolysis of the copolymer. The intercondensation with the guanazole resin always occurs simultaneously with the reaction with the

-containing organic compound.

When the polymer is hydrolyzed separately from the reaction with the

-containing organic compound, this may be done, for example, by heating the polymer with water and a suitable catalyst, examples of which are strong alkalies (e. g., sodium and potassium hydroxides, tetraalkyl ammonium hydroxides, etc.) and strongly acidic bodies (e. g., mineral acids such as hydrochloric, sulfuric, etc., and acidic salts such as aluminum chloride, zinc chloride, etc.) until the desired degree of hydrolysis has been effected. I prefer to use an acid catalyst. The hydrolyzed product, with or without first being purified (or partially reesterified if the hydrolysis has been carried farther than desired), then is acetalized, ketalized, or acetalized and ketalized by causing it to react under acid conditions with an aldehyde, a ketone, a mixture of different aldehydes, a mixture of different ketones, or a mixture of a single aldehyde and a single ketone or of a plurality of different aldehydes and different ketones. The reaction is continued until the desired percentage of hydroxyl groups in the hydrolyzed polymer have been replaced by acetal, ketal, or acetal and ketal groups. The solid reaction product is isolated from the reaction mass, washed and dried.

Preferably I conduct the acetalization, ketalization, or acetalization and ketalization reaction and simultaneous intercondensation with the guanazole resin under acid conditions, simultaneously with the hydrolysis of the polymer by treating the polymer with water, an acidic catalyst (examples of which have been given in the preceding paragraph), the guanazole and an organic compound containing or engendering an active carbonyl

grouping, e. g., aldehydes, ketones, etc. Preferably the reaction is carried out in the presence of a liquid medium adapted to cause a molecular dispersion or solution of the reaction product, e. g., in acetic acid, propionic acid, liquid (or liquifiable) monohydric alcohols, e. g., ethyl alcohol, butyl alcohol, amyl alcohol, etc., mixtures of liquid alcohols, acids, esters, etc. To shorten the time required to acetalize, ketalize, or acetalize and ketalize the polymer and intercondense it with the guanazole resin, it is desirable to maintain the reactants at an elevated temperature, say 60° to 100° C. or above, the exact temperature depending more or less upon the boiling point of the mixture. However, as previously pointed out, when a light colored product is desired, especially when a high molecular weight

-containing organic compound is used, I prefer that the reaction be carried out at room temperature.

After the hydrolysis, acetalization, ketalization, or acetalization and ketalization reaction and intercondensation reaction with the guanazole resin has been carried to the desired stage as determined by analysis or by previous experience, the reaction mass usually is mixed with water to which may be added, if desired, a neutralizing agent (e. g., sodium and potassium hydroxides and carbonates, ammonium hydroxide, etc.) for the acidic bodies. This causes coagulation of the treated polymer, which thereafter is washed until free of water-soluble materials and then dried. The resulting products can be shaped by the application of heat, pressure or heat and pressure.

As agents for treating the copolymer I may use any aldehyde or ketone or any compound engendering an aldehyde or a ketone, that is, a compound which will be converted to an aldehyde or a ketone during the reaction. Examples of such compounds are formaldehyde, paraformaldehyde, paraldehyde, trioxymethylene, acetaldehyde, propionaldehyde, butyraldehyde, cinnamic aldehyde, anisaldehyde, para-methoxy phenyl acetaldehyde, furfural, acetone, chloroacetone, methyl vinyl ketone, methyl ethyl ketone, acetophenone, benzophenone, benzil, benzoyl acetone, cyclohexanone, etc.

The properties, for example the hardness, of the product are considerably influenced by the particular treating agent used. Thus for the same polymer and the same degree of hydrolysis, acetalization and intercondensation with the guanazole resin, formaldehyde will yield a harder acetalized polymer than propionaldehyde. On the other hand, acrolein or furfural yield more solvent resistant products than formaldehyde.

The concentration of the polymerization catalyst and the temperature of polymerization used in the production of the polymer reactant also influence the properties of the final product. High catalyst concentration and/or high polymerization temperature yield polymers of lower molecular weight than result from lower amounts of catalyst and/or lower polymerization temperatures. These differences are reflected in the final reaction product.

The properties of the final product may be varied also by varying the extent of hydrolysis, the extent of reaction with the

-containing organic compound and the ratio of hydroxyl groups to substituent groups and the ratio of each to the number of ester groups remaining in the molecule. For example, two products with entirely different properties will result from the same polymer reactant if, in one case, the hydrolysis is carried to 90 per cent of that theoretically possible and the 45 per cent of the available hydroxyl groups are acetalized, ketalized, or acetalized and ketalized, while in the other case the hydrolysis is carried to 45 per cent of that theoretically possible and then 90 per cent of the available hydroxyl groups are acetalized, ketalized, or acetalized and ketalized.

The properties of these new artificial masses may be varied in still other ways. For example, their properties may be varied by carrying out the reaction with the

-containing organic compound in the presence of reactants other than the 1-substituted guanazoles which are capable of reacting with the

\>C=O /

-containing organic compound. Examples of such modifying reactants which may be used as such or in the form of their methylol derivatives, are the phenols, ureas, amino triazines, amides of mono- and polycarboxylic acids, sulfonamides, amines, etc., or compounds which are capable of reacting with the methylol compounds such as monohydric and polyhydric alcohols. However, for most applications I prefer that only the 1-substituted guanazole be used as the modifying reactant.

In order that those skilled in the art better may understand how the present invention may be carried into effect, the following illustrative examples are given. Vigorous stirring was maintained throughout all of the reactions. All parts are by weight.

*Example 1*

| | Parts |
|---|---|
| Polyvinyl acetate (Gelva V-25) | 500 |
| Acetic acid (glacial) | 1500 |
| Aqueous formaldehyde (37.1%) | 420 |
| 1-phenyl guanazole | 17.5 |
| Water | 150 |
| Concentrated sulfuric acid | 34 |

After the polyvinyl acetate was dissolved in acetic acid by heating at 70° C. for 2 hours, the 1-phenyl guanazole was added. As soon as this had dissolved the aqueous formaldehyde and water were added. The solution was perfectly clear with only a slight orange tint. The mixture was heated in a water bath at 70° C. for two hours and then cooled to 40° C. before slowly adding the concentrated sulfuric acid. The reaction was continued in the water bath at 70° C. for 24 hours. This reaction is believed to be a simultaneous hydrolysis and acetalization of the polyvinyl acetate and intercondensation with the guanazole-formaldehyde resin.

The acetalized product was transferred to a large vessel and precipitated with water under violent stirring. The porous precipitated mass was shredded and washed continually with water and dilute ammonia until no traces of acid were present. The product was dried in an oven at 70° C. The acetal was sheeted and pressed at elevated temperature and pressure.

*Example 2*

| | Parts |
|---|---|
| Polyvinyl alcohol (Solvar 20-15) | 259 |
| Glacial acetic acid | 1500 |
| Water | 150 |
| Aqueous formaldehyde (37.1%) | 420 |
| 1-phenyl guanazole (M. P. 175-176° C.) | 17.5 |
| Concentrated sulfuric acid | 34 |

The polyvinyl alcohol was dissolved in the acetic acid over a period of 3 hours, during which time the vessel containing the ingredients wa;

immersed in a water bath at 70° C. Water was added in order to get the alcohol completely into solution. After one hour the 1-phenyl guanazole was added and as soon as this was dissolved the formaldehyde was added. Heating was continued for 2 hours. After the addition of sulfuric acid catalyst, the bath was kept at 70° C. for 24 hours, at the end of which time the acetalized intercondensed product was poured into a large vessel. The acetal was precipitated with water and the porous mass broken into small pieces. These were washed with water and dilute ammonia until no trace of acid remained. The product was sheeted and molded at an elevated temperature and pressure.

*Example 3*

|  | Parts |
|---|---|
| Polyvinyl alcohol (Solvar 20-15) | 300 |
| Glacial acetic acid | 2500 |
| Water | 150 |
| n-Butyraldehyde (freshly distilled 73-75° C.) | 430 |
| 1-phenyl guanazole (M. P. 175-176° C.) | 20.2 |
| Concentrated sulfuric acid | 39 |

The polyvinyl alcohol was dissolved in the glacial acetic acid and water. In order to hasten solution the ingredients were heated to 60° C. and kept there for ½ hour. After cooling to room temperature the n-butyraldehyde was added. At first the solution was cloudy but gradually it cleared up until a water-white solution was obtained. The phenyl guanazole was added and after 1 hour the sulfuric acid catalyst was dissolved in the reaction medium. The reaction was allowed to proceed at room temperature for 75 hours. The acetal was partially separated from the acetic acid and butyraldehyde by precipitation with water. The acetal was dissolved in dioxane and precipitated from this solvent with water to free it from more of the acetic acid and butyraldehyde. The product was washed with water and dilute ammonia until no traces of acid remained. The product was sheeted on the differential rolls. A portion of the acetal was mixed with a plasticizer [triethylene glycol di-(2-ethyl butyrate)] and sheeted, to give a clear, tough, flexible sheet.

*Example 4*

|  | Parts |
|---|---|
| Polyvinyl acetate (Gelva V-25) | 500 |
| Glacial acetic acid | 1500 |
| Water | 150 |
| 1-(para-tolyl) guanazole (M. P. 169.5-170° C.) | 19.1 |
| Aqueous formaldehyde (37.1%) | 420 |
| Concentrated sulfuric acid | 34 |

The entire reaction was carried out at 70° C. The polyvinyl acetate was dissolved in the glacial acetic acid diluted with the water. After 15 minutes the 1-(para-tolyl) guanazole was added. The addition of formaldehyde was made 15 minutes later. After 90 minutes, the sulfuric acid was added to start the simultaneous hydrolysis and acetalization of the polyvinyl acetate and intercondensation with the guanazole-formaldehyde resin. The reaction was continued for 24 hours and then stopped.

The condensation product was precipitated from solution upon the addition of water and washed. It was then dissolved in dioxane and again precipitated with water. The precipitate was washed with water contaning a small amount of ammonia and finally with distilled water. It was then dried at 70° C. and sheeted on the differential rolls.

*Example 5*

Example 4 was repeated using 260 parts polyvinyl alcohol (Solvar 20-15) in place of the polyvinyl acetate (Gelva V-25). The reaction was carried out in the same manner as described above.

*Example 6*

|  | Parts |
|---|---|
| Polyvinyl alcohol (Solvar 20-15) | 259 |
| Glacial acetic acid | 2500 |
| Water | 150 |
| n-Butyraldehyde (73-75°) | 380 |
| 1-(para-tolyl) guanazole | 19.1 |
| Concentrated sulfuric acid | 34 |

The reaction was carried out at room temperature. The polyvinyl alcohol, acetic acid and water were stirred for ½ hour and then the butyraldehyde was added. The solution was again stirred until a homogeneous solution was obtained (approximately ½ hour) and then the 1-(para-tolyl) guanazole was added. After 15 minutes more the solution was acidified with concentrated sulfuric acid and the reaction kept at room temperature with constant stirring for 24 hours.

The resin was precipitated with water by adding just enough water (in small amounts) to produce incipient turbidity. A large volume of cold water was now added with rapid stirring. The precipitated mass was washed with water and placed in grade 2B alcohol. The condensation product slowly broke up into very small particles. After several hours the acetal was removed and again washed with water until no traces of acid could be determined. The acetal was dried at 70° C.

*Example 7*

|  | Parts |
|---|---|
| Polyvinyl acetate (Gelva V-25) | 500 |
| Glacial acetic acid | 1500 |
| Water | 150 |
| Aqueous formaldehyde (37.1%) | 420 |
| 1-(beta-naphthyl) guanazole (M. P. 191.5-192.5° C.) | 22 |
| Concentrated sulfuric acid | 34 |

This reaction was carried out in a water bath at 65-75° C. with constant stirring. The polyvinyl acetate and acetic acid were first stirred together for 2 hours after which the water and aqueous formaldehyde were added. Forty-five minutes later the 1-(beta-naphthyl) guanazole was added. The reaction mixture was allowed to stir 15 hours before the addition of the concentrated sulfuric acid and thereafter for 24 hours.

The acetic acid solution of the acetal was poured into a large receptacle and the product precipitated by adding small portions of cold water with constant stirring until a point was reached where the solution became very curdy. A large volume of cold water was rapidly added. The curdy mass broke up into very small particles which were easily washed free of aldehyde and acid. The product was dried at 70° C.

*Example 8*

|  | Parts |
|---|---|
| Polyvinyl alcohol (Solvar 5-25) | 259 |
| Glacial acetic acid | 6000 |
| Water | 200 |
| Aqueous formaldehyde (37.1%) | 420 |
| 1-(beta-naphthyl) guanazole (M. P. 191.5-192.5° C.) | 22 |
| Concentrated sulfuric acid | 34 |

This reaction was carried out at room temperature with continual stirring. The polyvinyl alcohol, 2000 parts glacial acetic acid and water were stirred together. Over a period of three hours, the remaining acid was added. The large volume of acetic acid was necessary to obtain a solution of low enough viscosity so that it could be stirred. The formaldehyde was now added and as soon as a homogeneous solution was obtained the 1-(beta-naphthyl) guanazole and concentrated sulfuric acid were added. The simultaneous acetalization and intercondensation reaction was allowed to proceed 70 hours. The acetal solution was treated as in Example 7. The final powder was dried at 70° C.

In each of the foregoing examples the acetal was pressed at 170° C. and 7,875 pounds per square inch for 2 minutes. The molded discs were removed after chilling and subjected to various comparative tests.

These tests included color comparison with a control sample produced in the same general manner as the acetals herein, with the exception that the guanazole derivative was omitted. The acetal used for the control sample was molded as above, and when examined was found to be a dark brown in color. The molded disk from the control sample gave a value for transparency of 33% when tested on a double sphere reflectometer. In contrast with this the molded product prepared in accordance with Example 1 was light yellow in color and gave a transparency value of 45%. Similarly, the molded product prepared in accordance with Example 2 was also light yellow in color and gave a transparency value of 47%.

The plasticized sheeted acetal obtained in accordance with Example 3 was water-white in color and almost perfectly transparent. Two pieces of sheet glass were placed together using the acetal sheet as an interlayer. The application of heat and very light pressure followed by chilling resulted in a piece of safety glass which was as transparent as the glass itself. When broken the pieces of glass did not separate from the plastic interlayer.

The products made in accordance with Examples 4, 5 and 6 also showed a marked improvement in color and a marked increase in relative transparency when compared to the control sample. Color stability and improved transparency is, therefore, one result of my invention.

In producing the improved polyvinyl acetal compositions of my invention, various aldehydes besides the specific aldehydes mentioned in the example may be used. The choice of aldehyde is dependent largely upon economic considerations and upon the particular properties desired in the finished product. Formaldehyde and butyraldehyde are the preferred aldehydes. Illustrative examples of other aldehydes that may be used have been given above.

Various modifying materials may be used with the synthetic compositions of my invention. These may include, for example, other synthetic or natural resins. Pigments, plasticizers, mold lubricants, opacifiers, fillers and the like may be compounded with the synthetic resinous compositions in accordance with conventional practice to provide molding compositions and molded products for particular service applications.

The resinous compositions of my invention are thermoplastic in character and may be molded into a variety of shapes under heat and pressure, more particularly at temperatures of the order of 100° to 200° C., preferably from 130° to 175° C. Molding pressures may be varied but preferably are within the range of 1,000 to 5,000 pounds per square inch for compression molding. Higher pressures may be desirable for injection molding applications.

In addition to their use in molding compositions and in the production of molded articles, these new plastic compositions may be dissolved or dispersed in solvents or swelling agents, e. g., dioxane, furfural, furfuryl alcohol, phenol, cresols, phenol alcohols, oxygenated solvents such as ketones, liquid aliphatic acids and alcohols, or in mixtures of such materials, to form liquid coating and impregnating compositions. Such liquid compositions also may contain oils, e. g., linseed oil, China-wood oil, perilla oil, soya bean oil, etc., pigments, plasticizers, driers and other addition agents commonly used in the production of paints, varnishes, lacquers, enamels, etc. Coating compositions made from these new synthetic materials (particularly those which are highly acetalized, ketalized, or acetalized and ketalized), when applied to a base member, e. g., metals, and air-dried or baked, are strong, tough, abrasion-resistant, have good adhesive properties and excellent resistance to heat, water and organic solvents.

As illustrative of how the synthetic compositions of this invention may be used in the field of electrical insulation, the following examples are cited:

A liquid coating composition comprising an acetalized, ketalized, or acetalized and ketalized, intercondensed polymer of the kind above described and a suitable volatile solvent is applied to a metallic conductor such as plain or tinned copper wire, for example, by passing the wire through a bath of the coating composition. Thereafter the coated wire is passed through a suitably heated oven to vaporize the solvent and to convert the coating to a hard, tough, flexible, abrasion-, moisture- and solvent-resistant state. In some cases it may be desirable to wrap the conductor with a fibrous material, e. g., asbestos in defibrated or other form or with glass fibers, cotton cloth, paper, etc., before treating it with the solution. A further procedure is to coat and at least partly impregnate the wrapped conductor with a syrupy solution of the treated polymer, wind the thus insulated conductor into the desired coil, and then heat the wound coil to evaporate the solvent and to harden the residual product.

Sheet insulation may be prepared by treating woven or felted organic or inorganic fabrics or paper with these new synthetic materials. Sheet insulation also may be prepared by binding together flaky inorganic substances with the new materials of this invention. For example, mica flakes may be cemented and bonded together with an acetalized, ketalized, or acetalized and ketalized, intercondensed polymer to form laminated mica products.

In addition to their use as electrically insulating materials the products of this invention have a wide variety of other applications. For instance, they may be used in the production of so-called "safety glass," wherein superimposed layers of glass are firmly united with a binder comprising one or more of these new synthetic materials. Particularly suitable for such applications are organic plastic materials produced by reaction of butyraldehyde with a hydrolyzed polymer of vinyl acetate intercondensed with a 1-substituted guanazole-butyraldehyde resin as was illustrated by Example 3. In such plastic materials the hydroxyl groups of the hydrolyzed polymer are replaced, at least partially, by butyral groups.

The modified or unmodified products of this invention have a wide variety of other uses, for instance in making interior finishing and construction materials for homes, offices, etc., particularly where high-impact strength and shock-resistant structures are desired. They also may be molded or otherwise suitably shaped to produce buttons, clock cases, radio cabinets, household utensils, decorative novelties, etc. Some of the synthetic materials of this invention are fiber-forming, that is, they can be drawn into continuous filaments. Such filaments may be made into felted or woven fabrics. The highly acetalized, ketalized, or acetalized and ketalized polymers are especially adapted for use as water repellants and sizings when applied to wood or the like, or to fibrous materials such as silk, cotton, wool, synthetic organic fibers, etc., in continuous filament, fabric or other form. The synthetic materials of this invention also may be used in making laminated fibrous sheet materials wherein super-imposed layers of cloth, paper, etc., are firmly bonded together with the synthetic material; in the construction of electric circuit interrupters; as impregnants for electrical coils and other electrical devices; as insulation for motors, generators and other dynamo-electric machines, e. g., as insulation for the coil windings, as slot insulation, in the form of sleevings over electrical connections, as separators between running and starting coil windings, etc.

What I claim as new and desire to secure by Letters Patent of the United States is:

1. The process of preparing new synthetic compositions which comprises reacting a

-containing organic compound selected from the class consisting of aldehydes and ketones with (1) a hydrolyzed, thermoplastic polymer of a vinyl ester of a monocarboxylic acid, and (2) a 1-substituted guanazole having the formula

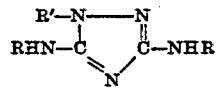

where R' is a monovalent hydrocarbon radical and R is a member of the class consisting of monovalent hydrocarbon radicals and hydrogen.

2. The process as in claim 1 wherein R' is a monovalent aryl radical.

3. The process as in claim 1 wherein R is hydrogen.

4. The process as in claim 1 wherein R' is a monovalent aryl radical and R is hydrogen.

5. The process of preparing new synthetic compositions which comprises hydrolyzing a thermoplastic polymer of a vinyl ester of a monocarboxylic acid and acetalizing the hydrolyzed polymer until at least some of the hydroxyl groups of the hydrolyzed polymer have been replaced by acetal groups while at the same time intercondensing the polymer with an aldehyde and a guanazole corresponding to the formula

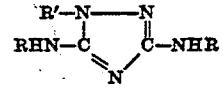

where R' is a monovalent hydrocarbon radical and R is a member of the class consisting of monovalent hydrocarbon radicals and hydrogen.

6. The process of preparing new synthetic compositions which comprises hydrolyzing a thermoplastic polymer of a vinyl ester of a monocarboxylic acid and acetalizing the hydrolyzed polymer until at least 50 per cent of the hydroxyl groups of the hydrolyzed polymer have been replaced by acetal groups while at the same time intercondensing the polymer with an aldehyde and a guanazole corresponding to the formula

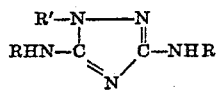

where R' is a monovalent hydrocarbon radical and R is a member of the class consisting of monovalent hydrocarbon radicals and hydrogen.

7. The process of preparing new synthetic compositions which comprises hydrolyzing a thermoplastic polymer of a vinyl ester of a monocarboxylic acid and ketalizing the hydrolyzed polymer until at least 50 per cent of the hydroxyl groups of the hydrolyzed polymer have been replaced by ketal groups while at the same time intercondensing the polymer with a ketone and a guanazole corresponding to the formula

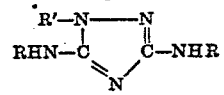

where R' is a monovalent hydrocarbon radical and R is a member of the class consisting of monovalent hydrocarbon radicals and hydrogen.

8. The process of preparing new synthetic compositions which comprises hydrolyzing a thermoplastic polymer of a vinyl ester of a monocarboxylic acid to at least 10 per cent of that theoretically possible and acetalizing the hydrolyzed polymer until at least 50 per cent of the hydroxyl groups of the hydrolyzed polymer have been replaced by acetal groups while at the same time intercondensing the polymer with an aldehyde and a guanazole corresponding to the formula

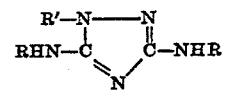

where R' is a monovalent hydrocarbon radical and R is a member of the class consisting of monovalent hydrocarbon radicals and hydrogen.

9. The process of preparing new synthetic compositions which comprises hydrolyzing a thermoplastic polymer of a vinyl ester of a monocarboxylic acid to from 25 to 100 per cent of that theoretically possible and acetalizing the hydrolyzed polymer until at least 50 per cent of the hydroxyl groups of the hydrolyzed polymer have been replaced by acetal groups while at the same time intercondensing the polymer with an aldehyde and a guanazole of the formula

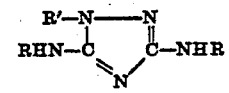

where R' is a monovalent hydrocarbon radical and R is a member of the class consisting of monovalent hydrocarbon radicals and hydrogen.

10. A composition comprising a reaction product of ingredients comprising (1) a

-containing organic compound selected from the class consisting of aldehydes and ketones (2) a hydrolyzed thermoplastic product of polymerization of a mixture containing a vinyl ester of a monocarboxylic acid, and (3) a 1-substituted guanazole having the formula:

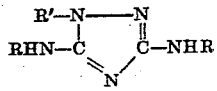

where R' is a monovalent hydrocarbon radical and R is a member of the class consisting of monovalent hydrocarbon radicals and hydrogen.

11. An organic plastic material obtained by reaction of an aldehyde with (1) a hydrolyzed, thermoplastic polymer of a vinyl ester of a monocarboxylic acid, and (2) a guanazole corresponding to the formula

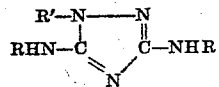

where R' is a monovalent hydrocarbon radical and R is a member of the class consisting of monovalent hydrocarbon radicals and hydrogen.

12. A composition comprising the resinous reaction product of ingredients comprising (1) a

-containing organic compound selected from the class consisting of aldehydes and ketones (2) a hydrolyzed, thermoplastic polymer of a vinyl ester of a saturated aliphatic monocarboxylic acid, and (3) a guanazole corresponding to the formula

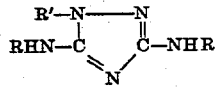

where R' is a monovalent hydrocarbon radical and R is a member of the class consisting of monovalent hydrocarbon radicals and hydrogen.

13. A composition comprising the acetal obtained by reaction of an aldehyde with (1) a hydrolyzed polymer of vinyl acetate, and (2) a 1-aryl substituted guanazole.

14. A synthetic plastic material obtained by reaction of formaldehyde with (1) a hydrolyzed polymer of vinyl acetate, and (2) a 1-aryl substituted guanazole.

15. A plastic composition obtained by reaction of butyraldehyde with (1) a hydrolyzed polymer of vinyl acetate, and (2) a 1-aryl substituted guanazole.

16. A composition comprising a plurality of sheets of glass bonded together with the plasticized composition obtained by the incorporation of a plasticizer into the product obtained by the reaction of butyraldehyde with (1) a hydrolyzed polymer of vinyl acetate, and (2) a 1-aryl substituted guanazole.

17. A composition as in claim 13 wherein the 1-aryl substituted guanazole is 1-phenyl guanazole.

18. A composition as in claim 13 wherein the 1-aryl substituted guanazole is a 1-tolyl guanazole.

19. A composition as in claim 13 wherein the 1-aryl substituted guanazole is a 1-naphthyl guanazole.

20. An insulated conductor comprising a metallic conductor and insulation thereon comprising a reaction product of ingredients comprising (1) a

-containing organic compound selected from the class consisting of aldehydes and ketones (2) a hydrolyzed, thermoplastic vinyl ester of a monocarboxylic acid, and (3) a guanazole corresponding to the formula

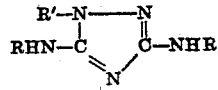

where R' is a monovalent hydrocarbon radical and R is a member of the class consisting of monovalent hydrocarbon radicals and hydrogen.

GAETANO F. D'ALELIO.